United States Patent
Xiong et al.

(10) Patent No.: US 8,864,911 B2
(45) Date of Patent: Oct. 21, 2014

(54) METHOD FOR REMOVING IONIC SPECIES FROM DESALINATION UNIT

(75) Inventors: Rihua Xiong, Shanghai (CN); Wei Cai, Shanghai (CN); Andrew Philip Shapiro, Schenectady, NY (US); Chengqian Zhang, Shanghai (CN); James Manio Silva, Clifton Park, NY (US); Zijun Xia, Shanghai (CN); Weiming Zhang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 403 days.

(21) Appl. No.: 12/411,443

(22) Filed: Mar. 26, 2009

(65) Prior Publication Data

US 2010/0242995 A1 Sep. 30, 2010

(51) Int. Cl.
| | |
|---|---|
| *B08B 7/04* | (2006.01) |
| *B08B 9/00* | (2006.01) |
| *C02F 1/46* | (2006.01) |
| *B01D 61/42* | (2006.01) |
| *C02F 1/469* | (2006.01) |
| *C02F 5/00* | (2006.01) |
| *C02F 101/10* | (2006.01) |

(52) U.S. Cl.
CPC ...... *B01D 61/422* (2013.01); *B01D 2311/2642* (2013.01); *C02F 1/4602* (2013.01); *C02F 1/4693* (2013.01); *C02F 1/4691* (2013.01); *C02F 1/469* (2013.01); *C02F 2209/03* (2013.01); *C02F 5/00* (2013.01); *C02F 2101/101* (2013.01); *C02F 2303/16* (2013.01); *C02F 2209/40* (2013.01)

USPC .............................. 134/13; 134/10; 134/22.1

(58) Field of Classification Search
USPC ............. 134/13, 10, 26, 30, 31, 42; 210/696, 210/652, 702, 636; 204/520, 450
See application file for complete search history.

(56) References Cited

U.S. PATENT DOCUMENTS

| | | |
|---|---|---|
| 5,192,432 A | 3/1993 | Andelman |
| 5,196,115 A | 3/1993 | Andelman |
| 5,702,582 A | 12/1997 | Goldstein et al. |

(Continued)

FOREIGN PATENT DOCUMENTS

| | | |
|---|---|---|
| DE | 3338194 A1 | 5/1985 |
| DE | 4313634 A1 | 10/1994 |

(Continued)

OTHER PUBLICATIONS

M. Tarek, Electrodialysis reversal in high CaSO4 supersaturation mode, Desalination 198 (2006) 288-294.*

(Continued)

*Primary Examiner* — Eric Golightly
*Assistant Examiner* — Arlyn I Rivera-Cordero
(74) *Attorney, Agent, or Firm* — Paul J. DiConza

(57) ABSTRACT

A method for removing ionic species from a desalination unit, comprises: (a) circulating a wash stream in a closed loop comprising a desalination unit and a precipitation unit, the wash stream flowing at a linear velocity of at least 5 cm/second through the desalination unit, the wash stream becoming more saline after passage through the desalination unit; and (b) removing a portion of calcium sulfate from the wash stream by precipitation in the precipitation unit to obtain a supersaturation degree of calcium sulfate in the wash stream entering the desalination unit in a range of from about 1.0 to about 3.0.

12 Claims, 2 Drawing Sheets

(56) References Cited

U.S. PATENT DOCUMENTS

Figure 1:
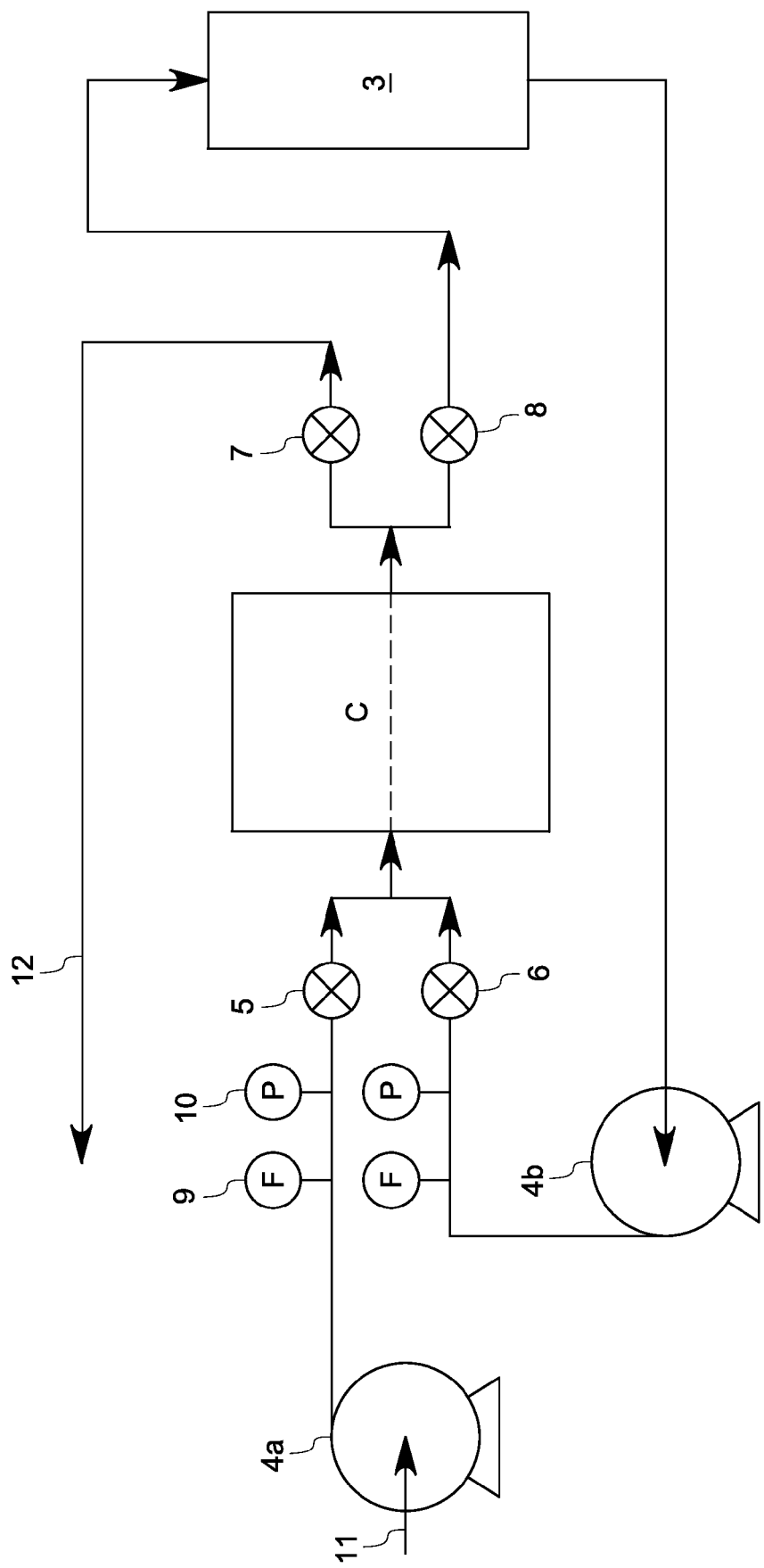

| | | | |
|---|---|---|---|
| 5,779,891 A * | 7/1998 | Andelman | 210/198.2 |
| 5,944,972 A | 8/1999 | Toda et al. | |
| 6,080,300 A * | 6/2000 | Goodwin | 205/751 |
| 6,113,797 A * | 9/2000 | Al-Samadi | 210/652 |
| 6,795,298 B2 * | 9/2004 | Shiue et al. | 361/508 |
| 7,974,076 B2 | 7/2011 | Xiong et al. | |
| 2004/0060823 A1 | 4/2004 | Carson et al. | |
| 2008/0057398 A1 | 3/2008 | Wei et al. | |
| 2008/0164209 A1 | 7/2008 | Zacerkowny et al. | |
| 2008/0185294 A1 | 8/2008 | Cai et al. | |

FOREIGN PATENT DOCUMENTS

| | | | |
|---|---|---|---|
| JP | 1085755 A | 4/1998 | |
| JP | 10323673 A | 12/1998 | |
| JP | 11514289 A | 12/1999 | |
| JP | 2001314863 A | 11/2001 | |
| JP | 2009018305 A | 1/2009 | |
| JP | 2010517746 A | 5/2010 | |
| WO | WO2006031732 A2 | 3/2006 | |
| WO | 2008094367 A1 | 8/2008 | |

OTHER PUBLICATIONS

M. Turek, Electrodialysis reversal in high CaSO4 supersaturation mode, Desalination 198 (2006) 288-294.*

M. Turek, Electrodialysis revesal in CaSO4 supersaturation mode, Desalination 198 (2006) 288-294.*

Machine Translation of DE3338194 to Klaus, published on Feb. 5, 1985.*

PCT International Search Report dated Jun. 9, 2010.

Unofficial English translation of Office Action from JP dated Jul. 16, 2013.

* cited by examiner

METHOD FOR REMOVING IONIC SPECIES FROM DESALINATION UNIT

BACKGROUND

1. Technical Field

Embodiments of the invention relate to methods for removing ionic species from desalination units.

2. Discussion of Related Art

Less than one percent of water on the earth's surface is suitable for direct consumption in domestic or industrial applications. With the limited sources of natural consumable water, de-ionization of seawater or brackish water, is a way to produce fresh water. In addition, other fluids sometimes are deionized before use, e.g., cheese whey is deashed using deionization technologies in many plants.

Deionization of liquids using currently available technologies usually produces two types of product streams, i.e., a waste stream with a higher concentration of ions and a recovery stream having a lower concentration of ions or in some instance being ion free. The waste stream is typically discarded as waste and the recovery stream is kept for consumption.

It is often desired that less consumable liquid be discarded (as the waste stream) from a certain feed stream. However, for presently available desalination (deionization) techniques, more recovered consumable liquid from certain feed streams usually means exposing the desalination systems to feeds having significantly higher concentrations of ions.

The high concentrations of ions may lead to scaling in the desalination system. For example, sparingly soluble salts, e.g., calcium sulfate ($CaSO_4$), in saline liquid may scale (precipitate or crystallize, etc.) in the desalination system and affect the performance of the desalination system.

It would be desirable to have a method for desalination that has a high recovery of consumable liquids and avoids scaling of sparingly soluble salts in the desalination system.

BRIEF DESCRIPTION

In accordance with embodiments described herein, a method is provided for removing ionic species from a desalination unit and comprises: (a) circulating a wash stream in a closed loop comprising a desalination unit and a precipitation unit, the wash stream flowing at a linear velocity of at least 5 cm/second through the desalination unit, the wash stream becoming more saline after passage through the desalination unit; and (b) removing a portion of calcium sulfate from the wash stream by precipitation in the precipitation unit to obtain a supersaturation degree of calcium sulfate in the wash stream entering the desalination unit in a range of from about 1.0 to about 3.0.

In accordance with embodiments described herein, a method is provided for removing calcium sulfate from a supercapacitive desalination unit and comprises: (a) circulating a wash stream in a closed loop comprising a supercapacitive desalination unit and a precipitation unit, the wash stream flowing at a linear velocity of at least 5 cm/second through the supercapacitive desalination unit, the wash stream having a higher concentration of calcium sulfate after passage through the supercapacitive desalination unit; (b) removing a portion of the calcium sulfate in the precipitation unit to obtain a supersaturation degree of calcium sulfate in the wash stream entering the supercapacitive desalination unit in a range of from about 1.0 to about 2.0.

In accordance with embodiments described herein, a method is provided for removing calcium sulfate from an electrodialysis desalination unit and comprises: (a) circulating a wash stream in a closed loop comprising an electrodialysis desalination unit and a precipitation unit, the wash stream flowing at a linear velocity of at least 5 cm/second through the electrodialysis desalination unit, the wash stream having a higher concentration of calcium sulfate after passage through the electrodialysis desalination unit; (b) removing a portion of the calcium sulfate in the precipitation unit to obtain a supersaturation degree of calcium sulfate in the wash stream entering the electrodialysis desalination unit in a range of from about 1.0 to about 2.0.

BRIEF DESCRIPTION OF THE DRAWING FIGURES

Figure 2:
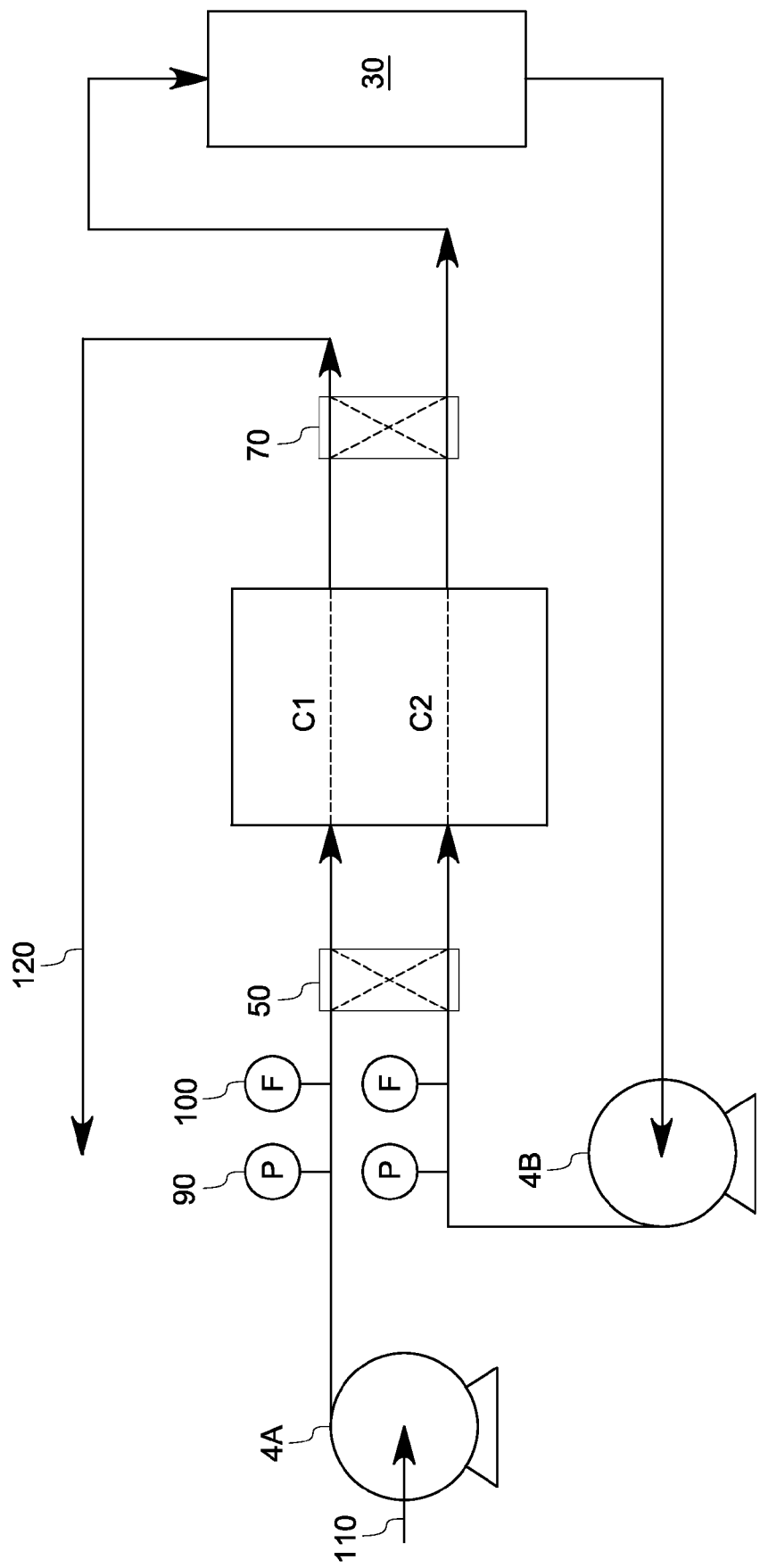

These and other features, aspects, and advantages of the present invention will become better understood when the following detailed description is read with reference to the accompanying drawings, in which like numbers represent substantially the same parts from figure to figure, wherein:

FIG. 1 shows a schematic flow diagram when the desalination unit is a supercapacitive desalination unit; and FIG. 2 shows a schematic flow diagram when the desalination unit is an electrodialysis (ED) desalination unit.

DETAILED DESCRIPTION

Embodiments of the invention relate to the field of deionization of liquids. Embodiments of the invention relate to methods for removing ionic species from saline liquids comprising one or more dissolved ionic compounds, e.g., calcium sulfate.

Although embodiments of ionic species removal methods described herein may be utilized for any application in which ionic species are to be removed from a liquid, for exemplary purposes only the ionic species removal method will be described in terms of a water purification method, for example, a desalination method.

Approximating language, as used herein throughout the specification and claims, may be applied to modify any quantitative representation that could permissibly vary without resulting in a change in the basic function to which it is related. Accordingly, a value modified by a term or terms, such as "about" or "substantially", is not to be limited to the precise value specified. In some instances, the approximating language may correspond to the precision of an instrument for measuring the value.

In accordance with embodiments described herein, an ionic species removal method is provided that includes: (a) circulating a wash stream in a closed loop comprising a desalination unit and a precipitation unit, the wash stream flowing at a linear velocity of at least 5 cm/second through the desalination unit, the wash stream becoming more saline after passage through the desalination unit; and (b) removing a portion of calcium sulfate from the wash stream by precipitation in the precipitation unit to obtain a supersaturation degree of calcium sulfate in the wash stream entering the desalination unit in a range of from about 1.0 to about 3.0.

In accordance with embodiments described herein, a method is provided for removing calcium sulfate from a supercapacitive desalination unit, and comprises: (a) circulating a wash stream in a closed loop comprising a supercapacitive desalination unit and a precipitation unit, the wash stream flowing at a linear velocity of at least 5 cm/second through the supercapacitive desalination unit, the wash stream having a higher concentration of calcium sulfate after passage through the supercapacitive desalination unit; (b)

removing a portion of the calcium sulfate in the precipitation unit to obtain a supersaturation degree of calcium sulfate in the wash stream entering the supercapacitive desalination unit in a range of from about 1.0 to about 2.0.

In accordance with embodiments described herein, a method is provided for removing calcium sulfate from an electrodialysis desalination unit, and comprises:(a) circulating a wash stream in a closed loop comprising an electrodialysis desalination unit and a precipitation unit, the wash stream flowing at a linear velocity of at least 5 cm/second through the electrodialysis desalination unit, the wash stream having a higher concentration of calcium sulfate after passage through the electrodialysis desalination unit; (b) removing a portion of the calcium sulfate in the precipitation unit to obtain a supersaturation degree of calcium sulfate in the wash stream entering the electrodialysis desalination unit in a range of from about 1.0 to about 2.0.

The desalination units for the ionic species removal method described herein may be any type or shape as long as they are suitable for use in electrochemical desalination to treat liquids comprising calcium sulfate. According to some aspects of the invention, the desalination unit may be, e.g., an electrodialysis (ED) desalination unit or a capacitive desalination unit.

An exemplary ED stack comprises a plurality of cation exchange membranes and anion exchange membranes arranged alternately with one spacer between every two adjacent membranes, and two electrodes at two terminals. The ion exchange membranes and the spacers form a plurality of ED flow channels.

There are typically two sets of flow channels in an ED stack, namely dilute channels and concentrate channels, appearing alternately in the stack according to streams flowing in the channels, i.e., the feed stream and the wash stream, respectively. In operation, ions of the feed stream in the dilute channel partially migrate out to adjacent concentrate channel to convert the feed stream into a recovery stream less saline than the feed stream. In contrast, the wash stream in the concentrate channel carries the ions migrated from the adjacent dilute channel and becomes more saline. In some instances when used an electrodialysis reversal stack, upon the reverse of the electrode polarity of the ED stack, the dilute channels and concentrate channels and corresponding streams flowing therein also reverse, so does the migration direction of ions.

In some embodiments, the desalination unit may be a capacitive desalination unit, e.g., a supercapacitive desalination unit comprising a stack of supercapacitor desalination cells. A supercapacitor is an electrochemical capacitor that has a relatively higher energy density when compared to a common capacitor. As used herein, supercapacitor is inclusive of other high performance capacitors, such as ultracapacitors. A capacitor is an electrical device that can store energy in the electric field between a pair of closely spaced conductors (called 'plates'). When voltage is applied to the capacitor, electric charges of equal magnitude, but opposite polarity, build up on each plate.

One exemplary supercapacitor desalination cell comprises: a first electrode comprising a first conducting material, wherein the first electrode may adsorb ions in the charge mode of operation of the cell and desorb ions in the discharge mode of operation of the cell; a second electrode comprising a second conducting material, wherein the second electrode may adsorb ions in the charge mode of operation of the cell and desorb ions in the discharge mode of operation of the cell; a spacer disposed between the first and second electrodes, wherein the spacer provides the flow channel for the liquid flowing between the first and the second electrodes. The first and second electrodes may be used together with ion exchange membranes or coating layer of ion exchange materials on the surfaces of the electrodes for better salt removal efficiency.

In the charge mode of operation, the feed stream is converted into the recovery stream by losing ions to the supercapacitor desalination unit. In the discharge mode of operation, the wash stream carries ions desorbed from the supercapacitor desalination unit and becomes more saline.

As used herein, water recovery refers to the ratio of the average volumetric flow rate of the recovery stream to the average volumetric flow rate of the feed stream, expressed as a percentage. For the purposes of the present disclosure, the water recovery is simply the ratio of the desalinated recovery stream volume to the feed stream volume in a given cycle. In a high recovery process, an average flow rate of the recovery stream is about 70 to about 99.5 percent of the average flow rate of the feed stream. More preferably, the average flow rate of the recovery stream is about 80 to about 99, or about 90 to about 99 or about 95 to about 99 percent of the average flow rate of the feed stream.

According to some aspects of the invention, the feed stream may be pretreated using a pretreatment process for removing suspended and colloidal particles, organisms, or organic matter before entering the desalination unit. The pretreatment process may be a particle removal process like cartridge filtration, multi-media filtration (MMF), microfiltration (MF), ultrafiltration (UF), or any combination thereof. The pretreatment process may also serve for the removal of organics present in the feed stream using a membrane bioreactor (MBR), a chemical oxidation unit, an electrochemical oxidation unit, or any other systems capable of removing organics from the feed stream. Other pretreatment processes such as lime softening, pH adjustment, decarbonation, deoiling, and the like, may also be used. Of course, the pretreatment process may be omitted when the feed stream contains few or no particles, organisms or organic materials.

The feed stream comprises among other dissolved ionic species one or more dissolved ionic inorganic salts including calcium sulfate which is sparingly soluble. To avoid scaling of sparingly soluble salts, e.g. calcium sulfate, in the desalination unit (either electrodialysis or supercapacitive) while the wash stream flows in the desalination unit, the wash stream circulates in a closed loop comprising the desalination unit and a precipitation unit. As used herein and hereafter, scaling refers to deposition of precipitate and/or crystals of otherwise dissolved salts or solutes on a surface in contact with a salt or solute-bearing liquid. The method of the present invention provides a balanced combination of flow velocity of the wash stream in the desalination unit and control over the supersaturation degree of sparingly soluble salts (calcium sulfate) in the wash stream entering the desalination unit, such that precipitation of sparingly soluble salts is confined to the precipitation unit.

According to some aspects of the invention, the linear velocity of the wash stream in the desalination unit is at least about 5 cm/second, or preferably from about 5 cm/second to about 100 cm/second, or more preferably from about 5 cm/second to about 50 cm/second and the supersaturation degree of calcium sulfate in the wash stream entering the precipitation unit is in a range of from about 1.0 to about 3.0 or preferably, from about 1.0 to about 2.0, or more preferably from about 1.0 to about 1.5 to avoid scaling of calcium sulfate in the desalination unit.

As used herein, linear velocity is defined as the fluid volumetric flow rate (volume/unit time) divided by cross section area of the flow channel in the desalination unit.

Supersaturation degree as used herein refers to the ratio of the concentration of a certain solute present in a solution to the concentration of that solute in a solution that is saturated with that solute at the temperature, pressure, and concentration of other species present in the solution. For example, at 25 deg C., the solubility of $CaSO_4$ in deionized water is about 2052 ppm. A deionized water solution at 25 deg C. containing 4104 ppm $CaSO_4$ has a supersaturation degree of 2.0. For a 5.13 wt % NaCl solution at 25 deg C., the solubility of $CaSO_4$ is about 2981 ppm $CaSO_4$. A 5.13 wt % NaCl solution of 25 deg C. that contains 4104 ppm $CaSO_4$ has a supersaturation degree of 1.37. A solution is saturated with a certain salt when supersaturation degree of this salt in the solution equals to 1 and is supersaturated when supersaturation degree is larger than 1. A supersaturation degree larger than 1 usually means there is a tendency for the salt to precipitate out and/or crystallize from the solution. The higher the supersaturation degree, the higher the precipitation/crystallization tendency.

Solubilizing additives such as antiscalants may reduce precipitation/crystallization of ionic species in the liquid. Antiscalants are sometimes used in certain desalination units to achieve higher water recovery by preventing precipitation/crystallization. For example, in the absence of antiscalants, the maximum safe supersaturation degree of $CaSO_4$ in the wash stream is about 1.5 for ED stacks under normal conditions. If a certain amount of antiscalant (e.g. 10 ppm Hypersperse MDC706 from General Electric Company, New York, US) is added to the wash stream, the operating supersaturation degree may be pushed up to 2.4 or even higher.

According to some aspects of the invention, instead of crystallization/precipitation prevention, crystallization/precipitation enhancement is desired in the precipitation unit. Therefore, embodiments described herein apply to operations with little or no active antiscalants, and the practical limits of the supersaturation degree and the linear velocity are for the case of no antiscalants, low dosage of antiscalants, or deactivated antiscalants which will not result in a change in the basic function to which it is related in the present invention.

In the wash stream, besides the salt, e.g., calcium sulfate, that is saturated or supersaturated in the liquid, the liquid may or may not contain other salts that may or may not be saturated or supersaturated. The supersaturation degree (or concentration) of calcium sulfate in the wash stream leaving the (either supercapacitive or electrodialysis reversal) desalination unit is higher than the supersaturation degree (or concentration) of calcium sulfate in the wash stream entering the desalination unit (from the precipitation unit). This is because some calcium sulfate, as well as other more soluble ions, are transferred from the desalination unit into the wash stream.

The supersaturation degree (concentration) of the calcium sulfate decreases in the precipitation unit when calcium sulfate precipitates out of solution as a solid in the precipitation unit. The liquid residence time in the precipitation unit may be used to control precipitation and to confine solid formation to the precipitation unit. That is, the longer the residence time of the wash stream in the precipitation unit, the more precipitation/crystallization in the precipitation unit, the lower the supersaturation degree (or concentration) of the wash stream entering the desalination unit and the lower the possibility of scaling in the desalination unit.

As used herein, the residence time of the wash stream in the precipitation unit refers to the average time period that a packet of wash fluid dwells inside the precipitation unit during the second mode of operation. Simply put, the residence time of the wash stream in the precipitation unit is the liquid volume in the precipitation unit divided by the volumetric flow rate of the wash stream through the precipitation unit.

Typically, the wash fluid enters the desalination unit at the same volumetric flow rate that the wash fluid enters the precipitation unit. Alternatively, when a second pump is utilized to bypass wash fluid past the precipitation unit directly back to the desalination unit feed point, the volumetric flow rate through the desalination unit is larger than the volumetric flow rate through the precipitation unit. For the purpose of this invention, we refer to the average residence time of wash fluid in the desalination unit as the fluid volume inside the desalination unit divided by the net volumetric flow rate of wash fluid through the desalination unit, where the net volumetric flow rate is the flow rate of liquid from the precipitation unit to the desalination unit. The residence time in the precipitation unit is in a range such that the supersaturation degree of calcium sulfate in the wash stream leaving the precipitation unit (and entering the desalination unit) is in a range of from about 1.0 to about 3.0 or preferably, from about 1.0 to about 2.0, or more preferably, from about 1.0 to about 1.5. Depending on the precipitator system design, the residence time required to achieve the desired supersaturation degree may be in the range of from about 3 minutes to about 300 minutes or preferably from about 3 minutes to about 60 minutes.

In one embodiment, in which the desalination unit is a supercapacitive desalination unit, all flow channels of the desalination unit are in either the charge or the discharge mode of operation during a first time period to accommodate the feed stream or the wash stream, respectively. All flow channels are then switched to the other mode during a second time period to accommodate the wash stream or the feed stream, respectively. The first time period may be shorter or longer than or equal to the second time period.

The alternate flow streams in each flow channel of the desalination unit (either supercapacitive or electrodialysis reversal) greatly reduces the scaling risk in the flow channel because it not only decreases the contact time of the flow channel with the saturated/supersaturated liquid in the wash stream but also provides effective "flushing" for the flow channel with the feed stream after contacting with the supersaturated liquid in the wash stream. The feed stream also provides dissolution capability for any newly formed crystals in the flow channel.

A controller may communicate with and control appropriate valves, sensors, switches and the like such that the mode of operation can reversibly switch between the charge mode and the discharge mode in response to defined criteria when the desalination unit is supercapacitive or the electrode polarity can reversibly switch in response to defined criteria when the desalination unit is electrodialysis reversal. Such criteria may include elapsed time, saturation, conductivity, resistivity, and the like.

The recovery stream from the desalination unit may be resubjected to de-ionization, for further treatment, by another type of desalination process, such as a reverse osmosis process, or by feeding it back to the same desalination unit.

The precipitation unit may be either a separate container with certain shape or an integral part of the piping system of the wash stream. It may be a concentrate tank or a precipitator. It may comprise at least one of or any combination of a stirred tank, a settling tank, and a clarifier unit.

According to some aspects of the present invention, there is a blow-down or purge stream (waste stream) removed from the precipitation unit. The volume of this blow-down or purge stream (waste stream) is replaced by introducing fresh feed into the precipitation unit. The average volumetric flow rate of the waste stream is about 0.5 to about 30, preferably about 1 to about 20, or preferably about 1 to about 10, or more preferably about 1 to about 5 percent of the average flow rate of the feed stream.

The disposal of the waste stream may be at a frequency that depends upon the application requirements. In one embodiment, the waste stream is disposed from the precipitation unit once at the end of one charge-discharge cycle of the supercapacitive desalination unit or one electrode polarity cycle of the electrodialysis desalination unit. In another embodiment, the waste stream is continuously disposed from the precipitation unit at an appropriate flow rate. The volume loss in the precipitation unit due to this disposal may then be compensated by a substantially equal amount of liquid. This make-up stream may be from the same source as the feed stream. By this means the liquid volume in the precipitation unit is kept within a substantially constant range from cycle to cycle. The disposal of the waste stream and the compensation thereof further ensures that the supersaturation degree of calcium sulfate in the wash stream entering the desalination unit is substantially constant and in a range of from about 1.0 to about 3.0 or preferably, from about 1.0 to about 2.0, or more preferably from about 1.0 to about 1.5 and that the concentration of highly soluble salts (e.g. NaCl) are also within constant ranges from cycle to cycle. This ensures that calcium sulfate and other salts will not continually increase in concentration from cycle to cycle, which protects the desalination unit against scaling.

The waste stream may be in the form of slurry or in the form of two or more separate streams, in which at least one stream contains solid species. The waste stream may comprise solids, which may comprise calcium sulfate. The waste may be treated by any known process suitable for treating highly concentrated water or slurries. For example, a thermal treatment device, such as an evaporator, a brine concentrator, a spray dryer, a crystallizer, an evaporation pond, or any combination thereof may be used to treat the waste stream. When a very high water recovery is achieved, the waste stream that needs to be handled is usually small, and the overall process may be operated as an economically attractive zero liquid discharge process. In other embodiments, the waste stream from the precipitation unit may be directly discarded to a surface water receiver, or a sewer, or injected into a deep well.

The concentration of ionic solutes in the wash stream will usually be tens to hundreds of times higher than the concentration of ionic solutes in the recovery stream. It is important to minimize cross-contamination between the concentrated wash stream and the dilute recovery stream. Therefore, during the transition, the inlet stream to the desalination unit may be switched from the wash stream back to the feed stream (the inlet switch) before the outlet stream of the desalination unit is switched from the wash stream back to the recovery stream (the outlet switch). The appropriate time interval between the inlet switch and the outlet switch is typically approximately the fluid residence time of the feed stream in the desalination unit, and may be determined by testing for each apparatus under consideration. A controller may be used to control these sequential or phased flow switches.

When the mode of operation of the supercapacitor desalination unit is transferred from a charge mode of operation to a discharge mode of operation, there is an energy release, similar to the energy release when a battery goes from a fully charged mode of operation to a discharged mode of operation. In certain embodiments, it may be desirable to harvest this energy for use using an energy recovery device, such as a converter (not shown). Thus, the supercapacitor desalination cells also may be in communication with the energy recovery device.

In certain embodiments, each of the first electrodes of the supercapacitive desalination unit may include a first conducting material and each of the second electrodes may include a same or different, second conducting material. As used herein the term conducting material refers to materials that are electrically conducting without regard to the thermal conductivity. In some embodiments, the first conducting material and the second conducting material may have particles with smaller sizes and large surface areas. Due to large surface areas such conducting materials may result in high adsorption capacity, high energy density and high capacitance of the cell.

Further, the first conducting material and the second conducting material may have high porosity. Each electrode may have a relatively high Brunauer-Emmet-Teller (BET) surface area. Each electrode may have a relatively low electrical resistivity (e.g., <200 Ohm-cm$^2$). In one embodiment, additional material may be deposited on the surfaces of the first and second electrodes where such additional materials include ion exchange materials, catalysts, anti-foulants, surface energy modifiers, and the like.

Further, the first conducting material and the second conducting material may include organic or inorganic materials. Additionally, electrically conducting fillers may also be used along with the conducting materials. Also, suitable adhesives, hardeners, or catalysts may also be employed with the conducting materials.

Although in the illustrated embodiment, the first and second electrodes of the supercapacitive desalination unit are shaped as plates that are disposed parallel to each other to form a stacked structure, in other embodiments, the first and second electrodes may have different shapes. Such other shapes may include rugate and nested bowl configurations. In one embodiment, the first and second electrodes may be disposed concentrically relative to each other in a roll-type arrangement.

Suitable spacers for either the supercapacitor or electrodialysis desalination unit may include electrically insulative polymers. Suitable electrically insulative polymers may include an olefin-based material. Suitable olefin-based material may include polyethylene and polypropylene, which may be halogenated. Other suitable electrically insulative polymers may include, for example, poly vinyl chloride, polytetrafloroethylene, polysulfone, polyarylene ether, and nylon. Further, the spacer may have a thickness in a range from about 0.0010 centimeters to about 1 centimeter. The electrically insulating spacer may be in the form of a membrane, a mesh, a mat, a sheet, a film, or a weave. To allow fluid communication, the electrically insulating spacer may be porous, perforated, or have fluid channels that extend from one major surface to another. The fluid channels, pores and perforates may have an average diameter that is less than 5 millimeters, and may be configured to increase turbulence of a through-flowing liquid. Such increased turbulence may positively affect the performance of the proximate electrode. In one embodiment, a mesh is used that has overlapping threads that are not coplanar. The out-of-plane threads may increase turbulence of the through-flowing liquid.

Further, each of the cells of the supercapacitor desalination unit may include current collectors, which are coupled to the first and second electrodes. The current collectors conduct electrons. The selection of current collector materials and operating parameters may affect the power consumption and lifetime of the cell. For example, a high contact resistance between one of the electrodes and the corresponding current collector may result in high power consumption. In certain embodiments, the conducting material of the first and second electrodes of the cell may be deposited on the corresponding current collectors. In such embodiments, the electrode conducting materials may be deposited on the current collector surface by one or more deposition techniques. Suitable deposition techniques may include sputtering, spraying, spin-coating, printing, dipping, or otherwise coating.

The supercapacitor desalination unit further may include support plates to provide mechanical stability to the structure. Suitable support plates may include one or more material selected from metal or plastic. Suitable metals include noble metals and ferrous-based alloys, such as stainless steel. Suitable plastics may include thermosets, such as acrylics, urethanes, epoxies, and the like; and thermoplastics, such as polycarbonates, polyvinyl chloride (PVC), and polyolefins. Suitable polyolefins may include polyethylene or polypropylene.

The ion exchange membranes and the electrodes for the electrodialysis desalination unit may be any conventionally used membranes and electrodes used in the electrodialysis desalination unit and know to persons skilled in the art.

The following examples are included to provide additional guidance to those of ordinary skill in the art in practicing the claimed invention. Accordingly, these examples do not limit the invention as defined in the appended claims.

In the following experiments, synthetic feedwater with the composition shown in Table 1 was made in the lab for testing. The Total Dissolved Solids (TDS) for the water was 2012.9 ppm with about 40% of the TDS as calcium and sulfate ions.

TABLE 1

| Composition | | | | | | | |
|---|---|---|---|---|---|---|---|
| $Ca^{2+}$ | $Mg^{2+}$ | $Na^+$ | $K^+$ | $SO_4^{2-}$ | $HCO_3^-$ | $NO_3^-$ | $Cl^-$ |
| Concentration (ppm) 210.2 | 59.9 | 321.2 | 41.5 | 595.0 | 197.6 | 144.9 | 442.6 |

EXAMPLE 1

FIG. 1 shows a schematic flow diagram of example 1. The desalination unit was a 5-cell supercapacitor desalination (SCD) stack. The effective area of each electrode of the cells was 400 $cm^2$ while the thickness of the spacer between the electrodes was 0.76 mm. Five hundred cycles were run in the test and each cycle included a charge step and a discharge step. Each charge step lasted for 15 minutes and each discharge step lasted for 30 minutes.

During the charge step, the SCD stack was charged at a constant current of 1000 mA. The voltage of the stack was observed to increase from about 2 V at the beginning of the charge step to about 5 V at the end of the charge step. The synthetic feedwater with the composition shown in Table 1 was used as the feed water in the feed stream 11 and was pumped into a flow channel C of the supercapacitor desalination stack by a pump 4a through a solenoid valve 5 while a solenoid valve 6 remained closed. In the charge step, the feed stream 11 was at least partially desalinated and was converted into a recovery stream 12, which was less saline than the feed stream 11. The recovery stream 12 was released through a solenoid valve 7 while a solenoid valve 8 remained closed. The recovery stream 12 could be directly consumed or subjected to another treatment step before direct consumption depending upon the requirements of the intended application.

A cylinder of Plexiglass™ with an inside diameter of 150 mm and a height of 400 mm was used as the precipitation unit 3 and 2000 ml of the synthetic feedwater was loaded into the cylinder for start up of the first discharge step in the 500 cycle test. In the discharge step, a wash stream from the precipitation unit 3 was pumped into the flow channel C by a pump 4b through the solenoid valve 6 while the solenoid valve 5 remained closed. During the discharge step, the ions absorbed onto the electrodes of the supercapacitor desalination stack 1 in the charge step were released back into the wash stream. The output wash stream from the flow channel C was diverted back into the precipitation unit 3 through the solenoid valve 8 while the solenoid valve 7 remained closed. During the discharge step, fluid was circulated between the precipitation unit 3 and the flow channel C of the supercapacitive desalination stack.

Flow meters 9 and pressure indicators 10 were used to monitor and control the streams. The charge and discharge states of the SCD stack were controlled by a pre-programmed electrical instrument (Land-20 V-5 A, Wuhan Jinnuo Electronic Co., Ltd., China). At the same time, the switching of the valves was controlled by a pre-programmed controller (SG2-20 HR-A, Taian Technology Wuxi CO., Ltd., China). The electrical status of the SCD stack and the flow switching were synchronized.

To further reduce the supersaturation degree of calcium sulfate in the precipitation unit 3 and maintain the highly soluble salt concentration in the precipitation unit 3 within a certain range, about 155 ml of fluid ("waste water") was pumped out of the precipitation unit 3 at the end of each discharge step via the pump 4b and the solenoid valves 6 and 7. Thereafter, feed stream water 11 (155 ml) was added to the precipitation unit 3 to maintain the total fluid volume in the precipitation unit 3.

The water flow rate was controlled at 500 ml/min, which corresponds to 8.6 cm/sec linear velocity during both the charge and discharge steps. The recovery water (also referred to herein as the recovery stream 12) volume in each cycle was 500 ml/minute×15 minutes=7500 ml and the feed stream volume was 7500 ml+155 ml=7655 ml. So the water recovery in this experiment was 7500 ml/7655 ml×100% 98%.

The liquid holdup inside the SCD stack 1 was about 400 cm×0.076 cm×5 cell/stack=152 ml, and the liquid holdup in the precipitation cylinder was 2000 ml. The residence time of water in the SCD stack 1 in the discharge mode was about 18 seconds, and the residence time of water in the precipitation cylinder in the discharge mode was about 240 seconds.

The stack voltage and current profiles were found to be very stable during the 500-cycle test. Precipitates formed and were kept in the cylinder during the test and were removed after the 500 cycle test was done. The supersaturation degree of $CaSO_4$ in the water entering the SCD stack from the precipitation cylinder was found to be in the range of 1.36 to 1.69 during the second mode of operation, with an average value of 1.56.

After the test, no scaling was found in any of the 5 cells of the SCD stack.

EXAMPLE 2

This experiment was conducted similarly to Example 1 except that the fluid flow rate during both the charge mode and the discharge mode was changed to be 1500 ml/min, or 25.7 cm/sec linear velocity through the channels in the stack. Precipitated material was kept in the cylinder and was removed after the 500-cycle test was completed. It was found that the supersaturation degree of $CaSO_4$ in the wash stream entering the SCD stack during the second mode of operation was in the range of 1.24 to 1.51, with an average value of 1.38.

After the test, no scaling was found on any of the 5 cells of the SCD stack.

EXAMPLE 3

Five 5-cell stacks were operated in series, using the same general procedure as in Examples 1 and 2. While operating the system in the first mode (charge), the synthetic wastewater was fed to the first stack, and the recovery stream was removed from the last stack. While operating the system in the second mode (discharge), the effluent from the last stack was sent to the precipitation unit, and the liquid from the precipitation unit was fed to the first stack. Here, the flow rate during both operating modes was held at 500 mL/min, which gave a linear velocity through the channels in the stack of 8.6 cm/sec. It was found that the supersaturation degree of $CaSO_4$ in the wash stream entering the SCD stack during the second mode of operation was in the range of 1.7 to 2.0. After the system was run for 500 cycles, the stack was disassembled and was found to have very slight scaling on only two out of the 25 cells. It is believed that with minor equipment modifications, the system could be run under these conditions with no scaling Comparative Example 1

A 15-cell stack was operated as in Examples 1 and 2. Here, the flow rate during both the first mode (charge) and second mode (discharge) was held at 500 mL/min, to give a linear velocity through the channels in the stack of 2.8 cm/sec. It was found that the supersaturation degree of $CaSO_4$ in the wash stream entering the SCD stack during the second mode of operation was in the range of 1.7 to 2.0. After the system was run for 500 cycles, the stack was disassembled and found to have severe scaling on all the cells of the SCD stack.

EXAMPLE 4

FIG. 2 shows a schematic flow diagram of example 4 where the desalination unit is a 5-cell electrodialysis (ED) desalination stack. The effective membrane area in the ED stack is 400 cm while the thickness of the spacer is 0.76 mm. The water flow rates in both dilute and concentrate channels are 500 ml/min, corresponding to a linear velocity of 8.6 cm/sec. A constant current of 1000 mA is used for the ED stack at either polarity states. The same cylinder as that used in Examples 1 and 2 is used as the precipitation unit in this experiment.

In a first time period, a (optionally pretreated) feed stream 110 is introduced into a first flow channel C1 via a pump 4A through the flow guidance of an inlet valve 50. At the same time, a wash stream is circulated in a closed loop comprising the cylinder 30 and a second flow channel C2 via a pump 4B, the inlet valve 50 and the outlet valve 70. In this time period, the first flow channel C1 is a dilute channel, where the ions in this channel partially migrate out to its adjacent second channel C2. The product (recovery) stream 120 from the first channels C1 flows out from the ED stack through the flow guidance of an outlet valve 70, and has salinity usually less than the feed stream 110. The second flow channel C2 now is a concentrate channel.

In a second time period after the first time period, the electrode polarity of the ED stack is reversed and the ions migrate towards the opposite direction, from the second flow channel C2 to the first flow channel C1. Thus the first flow channel C1 becomes the concentrate channel and the second flow channel C2 becomes the dilute channel. The inlet valve 50 and outlet valve 70 are also switched to synchronize with the electrode polarity reversal. The feed stream is now diverted to the second flow channel C2 and flows out as the product (recovery) stream 120 less saline than the feed stream 110. On the other hand, the wash stream circulates in a closed loop comprising the first flow channel C1 and the cylinder 30.

The reverse of the electrode polarity of the ED stack and the switch of the inlet and outlet valves are controlled by separate or integrated external controller (not shown in FIG. 2). An electrode polarity reversal interval of the electrodialysis stack is 15 minutes and may be in the range of about 5 minutes to about 100 minutes. Flow meters 90 and pressure indicators 100 may be used to help monitor/control of the streams.

At the end of each 15-minute period, 650 ml water is discarded from the precipitation unit and another 650 ml water from the feed stream is added to the same precipitation unit. All other parameters are kept as the same as in examples 1 and 2. During circulation of the wash stream in the closed loop comprising the concentrate channel of the desalination unit and the precipitation unit, some of calcium sulfate in the wash stream is removed as precipitates in the precipitation unit so that the supersaturation degree of $CaSO_4$ in the wash stream entering the ED stack is controlled in the range of 1.05 to 1.75 to avoid scaling in the ED stack.

The embodiments described herein are examples of compositions, structures, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A method of removing ionic species from a desalination unit, comprising:
   (a) circulating a wash stream in a closed loop comprising a desalination unit and a precipitation unit, the wash stream flowing at a linear velocity in a range of from about 8.6 cm/sec to about 25.7 cm/sec through the desalination unit, the wash stream comprising solid calcium sulfate, the wash stream becoming more saline after passage through the desalination unit, a residence time of the wash stream in the precipitation unit being in a range of from about 3 minutes to about 300 minutes;
   (b) removing a portion of calcium sulfate from the wash stream by physical precipitation in the precipitation unit;
   (c) removing a waste stream from the precipitation unit and providing a make-up stream into the precipitation unit to maintain a supersaturation degree of calcium sulfate in the wash stream entering the desalination unit in a range of from about 1.0 to about 1.5, wherein the waste stream comprises a liquid and the liquid has a volume corresponding to from about 1 to about 10 percent of a total volume of a feed stream presented to the desalination unit; and
   (d) switching an inlet stream of the desalination unit from the wash stream to the feed stream before switching an outlet stream of the desalination unit from the wash stream to a recovery stream, the recovery stream having a lower concentration of ionic species than the feed stream.

2. The method according to claim 1, wherein a residence time of the wash stream in the precipitation unit is in a range of from about 3 minutes to about 60 minutes.

3. The method according to claim 1, wherein the precipitation unit comprises at least one of a stirred tank, a settling tank, and a clarifier unit.

4. The method according to claim 1, wherein the desalination unit is an electrodialysis desalination unit.

5. The method according to claim 1, wherein a portion of the calcium sulfate in the precipitation unit is removed in the waste stream.

6. The method according to claim 5, wherein the liquid having a volume corresponding to from about 1 to about 5 percent of a total volume of a feed stream presented to the desalination unit.

7. The method according to claim 5, wherein the waste stream comprises solid calcium sulfate.

8. The method according to claim 1, wherein the desalination unit is a supercapacitive desalination unit operating in a discharge mode when the inlet stream is the wash stream.

9. The method according to claim 8, wherein in a charge mode, the feed stream becomes the recovery stream after passage through the desalination unit.

10. The method according to claim 9, wherein the discharge mode alternates with the charge mode.

11. A method for removing calcium sulfate from a supercapacitive desalination unit, comprising:
(a) circulating a wash stream in a closed loop comprising a supercapacitive desalination unit and a precipitation unit, the wash stream flowing at a linear velocity in a range of from about 8.6 cm/sec to about 25.7 cm/sec through the supercapacitive desalination unit, the wash stream comprising solid calcium sulfate, the wash stream having a higher concentration of calcium sulfate after passage through the supercapacitive desalination unit, a residence time of the wash stream in the precipitation unit being in a range of from about 3 minutes to about 300 minutes;
(b) removing a portion of the calcium sulfate by physical precipitation in the precipitation unit; and
(c) removing a waste stream from the precipitation unit and providing a make-up stream into the precipitation unit to maintain a supersaturation degree of calcium sulfate in the wash stream entering the supercapacitive desalination unit in a range of from about 1.0 to about 1.5, wherein the waste stream comprises a liquid and the liquid has a volume corresponding to from about 1 to about 10 percent of a total volume of a feed stream presented to the supercapacitive desalination unit; and
(d) switching an inlet stream of the supercapacitive desalination unit from the wash stream to the feed stream before switching an outlet stream of the supercapacitive desalination unit from the wash stream to a recovery stream, the recovery stream having a lower concentration of ionic species than the feed stream.

12. A method for removing calcium sulfate from an electrodialysis desalination unit, comprising:
(a) circulating a wash stream in a closed loop comprising an electrodialysis desalination unit and a precipitation unit, the wash stream flowing at a linear velocity in a range of from about 8.6 cm/sec to about 25.7 cm/sec through the electrodialysis desalination unit, the wash stream comprising solid calcium sulfate, the wash stream having a higher concentration of calcium sulfate after passage through the electrodialysis desalination unit, a residence time of the wash stream in the precipitation unit being in a range of from about 3 minutes to about 300 minutes;
(b) removing a portion of the calcium sulfate by physical precipitation in the precipitation unit; and
(c) removing a waste stream from the precipitation unit and providing a make-up stream into the precipitation unit to maintain a supersaturation degree of calcium sulfate in the wash stream entering the electrodialysis desalination unit in a range of from about 1.0 to about 1.5, wherein the waste stream comprises a liquid and the liquid has a volume corresponding to from about 1 to about 10 percent of a total volume of a feed stream presented to the electrodialysis desalination unit; and
(d) switching an inlet stream of the electrodialysis desalination unit from the wash stream to the feed stream before switching an outlet stream of the electrodialysis desalination unit from the wash stream to a recovery stream, the recovery stream having a lower concentration of ionic species than the feed stream.

* * * * *